April 29, 1930.  H. M. STOLLER ET AL  1,756,573
REGULATOR SYSTEM
Filed Sept. 20, 1928
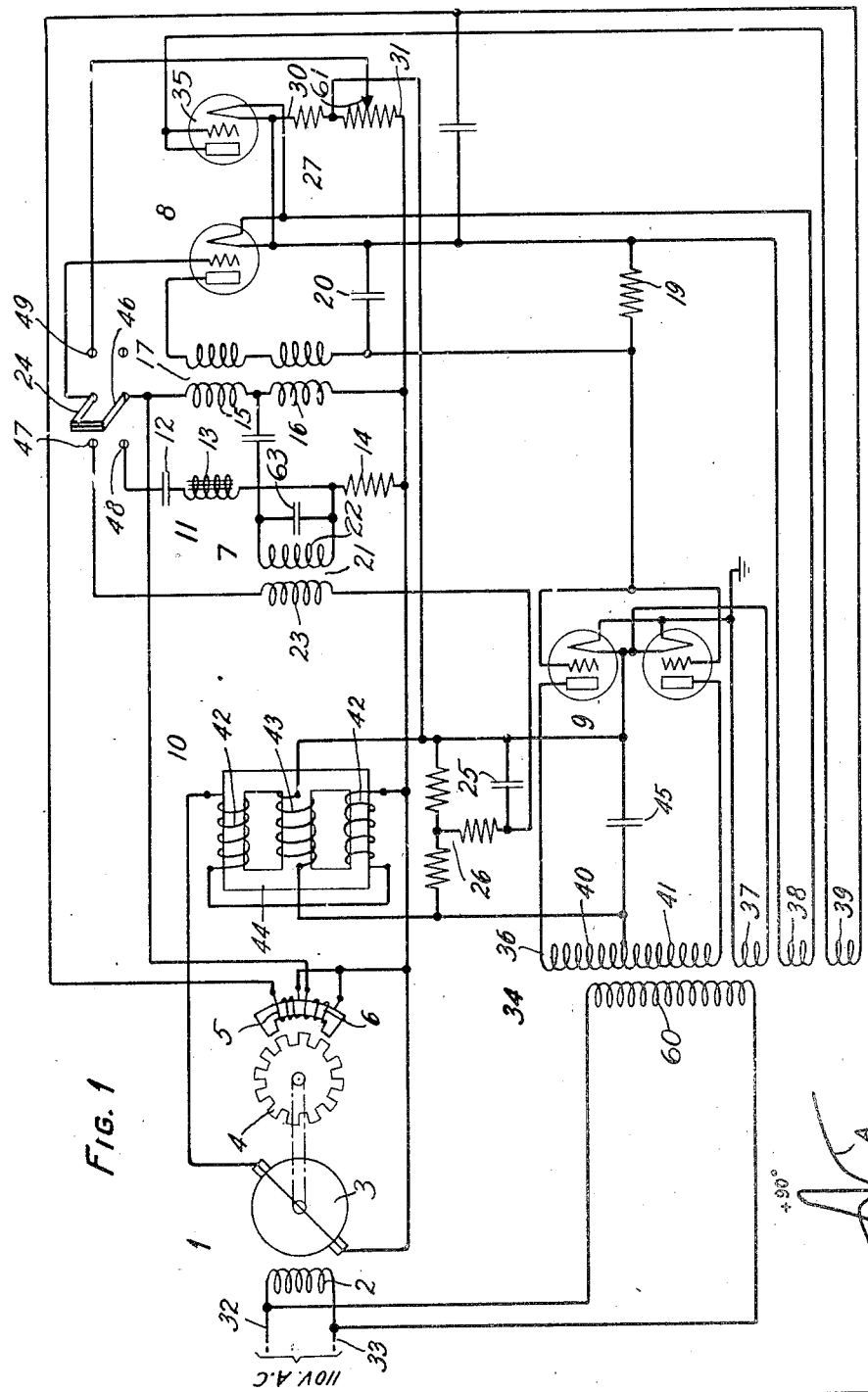
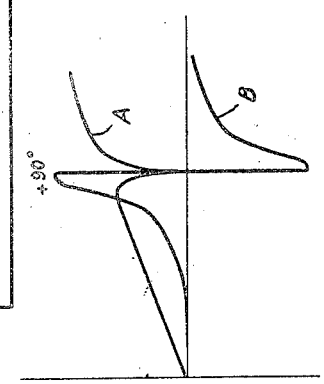
INVENTORS
H. M. STOLLER
G. C. PORTER
BY Wayne B Wells
ATTORNEY Patented Apr. 29, 1930

1,756,573

UNITED STATES PATENT OFFICE

HUGH M. STOLLER, OF MOUNTAIN LAKES, AND GEORGE C. PORTER, OF MIDLAND PARK, NEW JERSEY, ASSIGNORS TO BELL TELEPHONE LABORATORIES, INCORPORATED, OF NEW YORK, N. Y., A CORPORATION OF NEW YORK

REGULATOR SYSTEM

Application filed September 20, 1928. Serial No. 307,139.

This invention relates to regulator systems and particularly to speed regulator systems for maintaining the speed of alternating current motors constant.

One object of the invention is to control the operation of a motor in an improved manner to maintain the speed thereof substantially constant.

Another object of the invention is to provide a motor speed regulator system that shall control the motor speed in a new and an improved manner according to the phase relation of the potentials impressed on the grid and the plate of a three-element space discharge device.

A further object of the invention is to provide a motor speed regulator system of the above indicated character that shall employ a pilot generator in an improved manner to lower the load on the generator and insure constant speed operation of the motor, and that shall provide for operating the motor at will when precise regulated operation thereof is not desired.

In many cases it is very essential to insure the operation of a motor at constant speed. An example where very exact speed regulation of a motor is essential is in the reproduction of sound synchronously with a moving picture. The present invention is an improvement on the regulator system disclosed in the patent of H. M. Stoller No. 1,695,035, dated Dec. 11, 1928 and has some features in common with the regulator system disclosed in the patent of H. M. Stoller No. 1,711,661, dated May 7, 1929.

In the preferred embodiment of our invention a motor having stator and rotor windings operates a pilot generator. The pilot generator, which produces a current having a frequency varying according to the motor speed, supplies current to a Wheatstone bridge circuit and to a so-called phase detector thermionic tube. The bridge circuit has one arm in the form of a resonant circuit which is tuned to the frequency of the pilot generator current when the motor is operating at normal speed. Two other arms of the bridge circuit comprise sections of the primary winding of a transformer connected between the pilot generator and the phase detector tube. The input circuit of the detector tube is connected to two opposite vertices of the Wheatstone bridge. The phase of the potential impressed on the grid of the detector varies with respect to the potential impressed on the plate of the tube according to the frequency of the current produced by the pilot generator. The variation in the phase of the bridge current according to the frequency of the current supplied thereto is explained in detail in the above mentioned patent of H. M. Stoller, No. 1,695,035. Thus the output of the detector tube varies according to the frequency of the pilot generator current and the speed of the motor.

A rectifier tube, which is connected to the alternating supply circuit for the motor, provides rectified current for the field winding of the pilot generator. The rectifier also supplies negative biasing potential for the grid of the phase detector tube. Two rectifier-amplifier thermionic tubes are coupled to the detector tube and control an inductive reactance in the rotor circuit of the motor. Thus the detector tube and the amplifier tube are controlled by the pilot generator to vary the impedance of the inductive reactance so as to hold the motor speed constant.

Means is also provided in the system whereby precise regulated operation may be dispensed with and the motor may be operated at will within certain speed limits. A switch is provided for excluding the bridge circuit from the system and for permitting control of the system by varying the negative biasing potential impressed on the grid of the detector tube.

In the accompanying drawing Fig. 1 is a diagrammatic view of a regulator system constructed in accordance with the invention.

Fig. 2 is a view of curves showing the operation of the Wheatstone bridge circuit.

Referring to the drawing, a repulsion motor 1 comprising a stator winding 2 and a rotor winding 3 is directly connected to a pilot generator 4 having a field winding 5 and an armature winding 6. The pilot generator 4 controls a Wheatstone bridge circuit 7, a phase detector tube 8, two rectifier-amplifier tubes 9 and an inductive reactance 10 for controlling the speed of the repulsion motor 1. The frequency of the current produced by the pilot generator varies directly in accordance with the speed of the repulsion motor and the regulator system is controlled in accordance with the variation in frequency of the pilot generator current.

The Wheatstone bridge circuit 7 is provided with a resonant arm 11 comprising a condenser 12 and an inductance element 13, a resistance arm 14, and two arms 15 and 16 which comprise sections of the primary winding of a transformer 17. The resonant arm 11 is tuned to the frequency of the current produced by the pilot generator when the repulsion motor 1 is operated at normal speed. The transformer 17, the primary winding of which comprises two arms of the Wheatstone bridge circuit, serves to supply plate current from the pilot generator for the phase detector tube 8. A coupling resistance 19 is included in the output circuit of the detector tube 8 for coupling this tube to the rectifier-amplifier tubes 9. A condenser 20 is bridged across the coupling resistance 19 to smooth out ripples in the current. A transformer 21 comprising a primary winding 22 and a secondary winding 23 is provided for connecting the input circuit of the detector tube to the Wheatstone bridge circuit. The primary winding 22 is connected to two opposite vertices of the Wheatstone bridge circuit and the secondary winding 23 is connected in the input circuit of the detector tube. The input circuit for the detector tube may be traced through a two-poled-double-throw switch 24, secondary winding 23, capacity element 25 in parallel with resistance elements 26, and a potentiometer 27. The capacity element 25 and the resistance elements 26 serve to effect a feed-back on the grid of the detector tube 8 in the manner disclosed in the patent to H. M. Stoller No. 1,663,890, dated March 13, 1928. This feed-back circuit serves to compensate the regulator system and to hold the speed substantially constant without any hunting action. The potentiometer 27 is adjustable and is supplied with current in a manner to be hereinafter disclosed to produce a positive terminal 30 and a negative terminal 31. The potentiometer when connected in the input circuit of the detector tube 8, as shown on the drawing, serves to impress a negative biasing potential on the grid of the detector tube. A phase correcting condenser 63 is connected across the secondary winding 22 of the transformer 21 to insure impressing a grid voltage 180 degrees out of phase with respect to the plate voltage when the circuit is operating above the bridge balancing point.

The stator winding of the repulsion motor 1 is connected to a supply circuit comprising conductors 32 and 33. A transformer 34 is connected to the supply conductors 32 and 33 for supplying alternating space current to the rectifier-amplifier tubes 9, for supplying filament current to the amplifier tubes 9, the detector tube 8 and a rectifier tube 35, and for supplying space current to the rectifier tube 35. The rectifier tube 35 supplies current to the potentiometer 27 and to the field winding 5 of the pilot generator 4. The transformer 34 comprises primary winding 60 connected to the main supply circuit and secondary windings 36, 37, 38 and 39. The secondary winding 36 is divided into sections 40 and 41 for supplying space current to the rectifier-amplifier tubes 9. The secondary winding 37 supplies filament current to the amplifier tube 9. The secondary winding 38 supplies filament current to the rectifier tube 35 and the detector tube 8. The secondary winding 39 supplies space current to the rectifier 35.

The inductive reactance 10 comprises two alternating current windings 42 and a direct current winding 43 which are mounted on a core member 44. The alternating current windings 42 are connected in the rotor circuit of the repulsion motor 1, and the direct current winding 43 is connected in the output circuits of the rectifier-amplifier tubes 9. It is thus apparent that the impedance of the circuit of the rotor 3 is varied in accordance with the output of the rectifier-amplifier tubes 9. A condenser 45 is bridged across the direct current winding 43 for smoothing out ripples in the current supplied thereto.

The switch 24 comprises switch members 46 which are adapted to engage either contact members 47 and 48 or a contact member 49. When the switch 24 is closed in the position towards the left with the switch members 46 engaging the contact members 47 and 48, the regulator system is connected for precise regulation at a fixed speed. When the switch is thrown toward the right with one of the switch members 46 engaging the contact member 49, the Wheatstone bridge circuit 7 is excluded from the regulator system and the repulsion motor 1 may be operated at certain speeds within certain limits. With the switch 24 in the latter position, the speed of the repulsion motor is controlled by varying the negative biasing potential impressed on the grid of the detector tube 8. The biasing potential impressed on the detector tube is controlled by moving the contact member 61 on the potentiometer 27.

Assuming the switch 24 shown in Fig. 1 of the drawing to be closed towards the left for giving precise regulation, the operation of this system is as follows: The initial positive bias on the grids of the two rectifier-amplifier tubes 9 from the potentiometer 27 serves to produce a large space current flow through the amplifier tubes 9 and accordingly a large current flow through the direct current winding 43 of the inductive reactance 10. This will cause the alternating current windings 42 of the inductive reactance to present low impedance to the terminals of the rotor winding 3 and permit the motor to accelerate rapidly as a repulsion motor.

When the repulsion motor is operating below normal speed, the bridge circuit 7 will be unbalanced due to the fact that the capacity-reactance of the condenser 12 will exceed the inductive reactance of the inductance 13 of the resonant arm 11. The transformer 21 will then deliver a large output voltage to the grid of the detector tube 8. The plate of the detector tube 8 is supplied with alternating current from the pilot generator by the transformer 17 which is so poled that when the frequency of the generator current is below the bridge balance, the grid of the detector tube is negative at the same time that the plate has positive potential impressed thereon. Accordingly, during the half cycle in which the tube can pass space current, the output of the transformer 21 drives the grid of the detector tube 8 further negative and therefore very little space current can pass through the detector tube. It is therefore apparent that very small potential drop will be produced across the coupling resistance 19 and the grids of the rectifier-amplifier tube 9 will remain positive under the control of the potentiometer 27. Accordingly, it is apparent under this condition that the repulsion motor 1 will continue to accelerate. When the frequency of the pilot generator current reaches the tuning point of the resonant arm 11, the inductive reactance of the coil 13 balances the capacity reactance of the condenser 12 and the impedance of the tuned arm is matched by the resistance 14. When the bridge is at this operating point, there is no voltage delivered from the transformer 21 to the grid of the detector tube.

Above the bridge circuit balancing point there will again be an output voltage delivered from the transformer 21 to the grid of the detector tube 8. However, the phase angle of the output will be shifted 180° thereby driving the grid of the detector tube 8 positive during the half cycle in which the plate voltage is positive. This increases the plate current in the detector tube which produces a greater potential drop across the coupling resistance 19. The coupling resistance 19 impresses a negative potential on the grids of the amplifier tubes 9 in opposition to the positive potential impressed on such grids by the potentiometer 27. The negative potential impressed on the grids of the amplifier tube reduces the plate current of these tubes and accordingly increases the impedance of the inductive reactance 10. Consequently, the current through the rotor winding of the repulsion motor 1 is reduced to lower the motor speed. The regulator system is so adjusted that normal operating speed for the repulsion motor is reached at the balancing point of the Wheatstone bridge circuit.

In Fig. 2 of the drawing a curve A shows the effective voltage impressed from the Wheatstone bridge circuit upon the grid of the detector tube 8. The curve B shows the phase of the output from the bridge circuit which is impressed on the grid of the detector tube 8. The abscissa for the curves shown in Fig. 2 represents the frequency of the pilot generator current and the ordinates may be either in terms of phase or effective voltage according to whether curve B or curve A is being considered.

If the motor has a tendency to slow down as by a reduction in the line voltage or increased load, the bridge circuit will tend to unbalance and cause the grid of the detector tube 8 to go negative when the plate of such tube goes positive. This will tend to cause a reduction in the current flow through the detector tube and a reduction of the negative biasing potential impressed on the grids of the rectifier-amplifier tubes 9. Accordingly, the current flowing through the rectifier-amplifier tubes is increased and the impedance of the inductive reactance is lowered to increase the speed of the repulsion motor to compensate either change of line voltage or motor load. In actual operation the mode of regulation is accomplished without noticeable change in speed due to the action of the feed back circuit above mentioned.

Modifications of the system and arrangements and location of parts may be made within the spirit and scope of the invention and such modifications are intended to be covered by the appended claims.

What is claimed is:

1. A speed regulator system comprising a motor having stator and rotor windings, a source of alternating current having the frequency thereof varied according to the motor speed, means for varying the phase of the current from said source according to the frequency thereof, a detector space-discharge device having space current supplied thereto by said source and having the input circuit connected to said phase varying means, rectifier-amplifier space discharge devices controlled by said detector device, and an inductive reactance in the circuit of said rotor winding controlled by said rectifier-amplifier devices for maintaining the motor speed constant.

2. A speed regulator system comprising a motor, a main source of alternating current for operating the motor, an auxiliary source of alternating current having a frequency varying according to the speed of the motor, means for varying the phase of the current from the auxiliary source according to the frequency thereof, a three element detector tube controlled by said phase varying means, two rectifier-amplifier tubes coupled to said detector tube, means for supplying alternating space current from said auxiliary source to said detector tube, means for supplying space current to the amplifier tubes from said main source of alternating current and means controlled by the detector tube and rectifier-amplifier tubes for maintaining the motor speed constant.

3. A speed regulator system comprising a motor having stator and rotor windings, a source of alternating current having the frequency thereof varied according to the speed of said motor, means for varying the amplitude of the effective voltage from said source according to the frequency thereof, a detector space discharge device having space current supplied thereto by said source and having the input circuit connected to said amplitude varying means, and means comprising rectifier-amplifier space discharge devices controlled by said detector device for governing said motor to maintain the speed thereof constant.

4. A regulator system comprising a motor connected to a source of alternating current, a pilot generator operated by said motor to produce current having a frequency varying according to the motor speed, a Wheatstone bridge circuit having one arm in the form of a tuned circuit and two other arms forming the primary winding of a transformer, the terminals of said primary winding at two opposite bridge vertices being connected to said pilot generator, a space discharge tube supplied with space current by said transformer, the input circuit of said device being connected to the bridge vertices opposite the pilot generator connection to the bridge, and means controlled by said device for maintaining the motor speed substantially constant.

5. In a speed regulator system for an alternating current motor, a pilot generator operated by said motor to produce a current having a frequency varying according to the motor speed, means comprising a Wheatstone bridge circuit connected to said generator for varying the phase relation of the current therefrom with respect to the generator current according to the generator frequency, a detector thermionic tube having the input circuit thereof connected to said bridge circuit and supplied with space current by said generator, two rectifier-amplifier tubes coupled to said detector tube, and means controlled by said rectifier-amplifier tubes for maintaining the speed of said motor substantially constant.

6. A regulator system comprising a motor having stator and rotor windings, a pilot generator operated by said motor, a Wheatstone bridge circuit having one arm thereof in the form of a tuned circuit, said bridge circuit having two opposite vertices connected to the pilot generator, a space discharge device supplied with space current by said pilot generator and having the input circuit thereof connected to the other two vertices of the bridge circuit, a thermionic amplifier coupled to said space discharge device, and an inductive reactor controlled by said amplifier and inserted in the circuit of said rotor winding.

7. A regulator system comprising a motor having stator and rotor windings, a source of alternating current having a frequency varying according to the speed of said motor, a Wheatstone bridge circuit having one arm thereof in the form of a tuned circuit, said arm being tuned to the frequency of said source of current when the motor is operating at normal speed, a transformer connected to said source of current and having the primary winding divided to form two arms of the bridge circuit, the terminals of the primary winding of said transformer at two opposite vertices of said bridge circuit being connected to said source of current, a space discharge device having space current supplied thereo by said transformer, means for connecting the input circuit of said discharge device to the bridge circuit, two rectifier-amplifier devices coupled to said space discharge device, and means controlled by said rectifier-amplifier devices for governing the speed of said motor.

8. In a speed regulator system for an alternating current motor, a source of alternating current having a frequency varying according to the motor speed, means comprising a Wheatstone bridge circuit for varying the phase of the current from said source according to the frequency thereof, means comprising a three-element space discharge device controlled by said bridge circuit for maintaining the motor speed constant, means for impressing a negative biasing potential on the grid of said device and means for excluding the bridge circuit from the system and for governing the negative bias on the grid of said device to control the motor speed at will.

9. In a speed regulator system for a motor, a source of alternating current having a frequency varying according to the motor speed, means for varying the phase of the current from said source according to the frequency thereof, means comprising a three element space discharge device controlled by said phase changing means for governing said motor to maintain the speed thereof substantially constant, means for impressing a negative biasing potential on the grid of said device, and means for excluding said phase changing means from controlling the discharge device and for controlling the discharge device by varying the negative biasing potential on the grid thereof to govern the motor speed at will.

10. A regulator system comprising a repulsion motor connected to a source of alternating current, a pilot generator operated by said motor for generating current having a frequency varying according to the motor speed, an inductive reactance for controlling the speed of said motor, two rectifier-amplifier tubes, a detector tube coupled to said two rectifier-amplifier tubes for controlling said inductive reactance, means for supplying space current to the rectifier-amplifier tubes from said source of alternating current and for supplying space current for the detector tube from said pilot generator, means comprising a Wheatstone bridge circuit connected between the pilot generator and said detector tube for impressing a potential on the detector grid having a phase variation with respect to the plate potential according to the frequency of the generator current, said detector tube being controlled according to the phase of the bridge current to control said inductive reactance and maintain the motor speed constant, means comprising a potentiometer for impressing a negative bias on the grid of said detector, and means for excluding said bridge circuit from the system and for controlling said detector tube by the potentiometer to govern the motor speed at will.

11. A regulator system comprising a motor having stator and rotor windings, a source of alternating current having a frequency varying according to the motor speed, a space discharge device supplied with alternating plate potential by said source, means for impressing a potential on the grid of said device from said source, the phase and the potential of which vary according to the frequency of the alternating current, and means comprising an inductive reactor controlled by said device and inserted in said rotor winding to maintain the motor speed constant.

12. A regulator system comprising a motor having stator and rotor windings, a source of alternating current having a frequency varying according to the motor speed, a space discharge device supplied with alternating plate potential by said source, means for impressing a potential on the grid of said device from said source, the phase of which varies according to the frequency of the alternating current source, and means comprising an inductive reactor controlled by said device and inserted in said rotor winding to maintain the motor speed constant.

13. In a speed regulator system for an alternating current motor, a source of alternating current having a frequency varying according to the motor speed, means for varying the phase and potential of the current from said source according to the frequency thereof, means comprising a three-element space discharge device controlled by said phase varying means for maintaining the motor speed constant, means for impressing a negative biasing potential on the grid of said device, and means for excluding the phase varying means from the system and for controlling the negative bias on the grid of said device to govern the motor speed at will.

In witness whereof, we hereby subscribe our names this 17th day of September, 1928.

HUGH M. STOLLER.
GEORGE C. PORTER.